Feb. 11, 1969  G. D. LEWIS  3,426,409
METHOD OF MAKING A TUBULAR WALLED CHAMBER
Original Filed Jan. 26, 1965
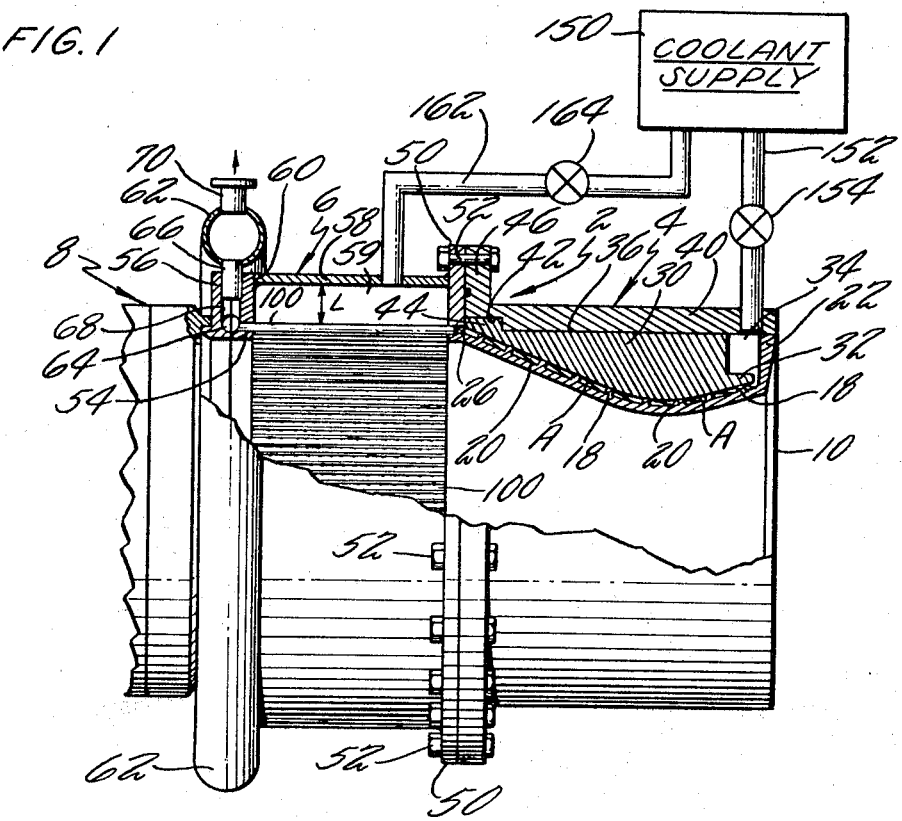
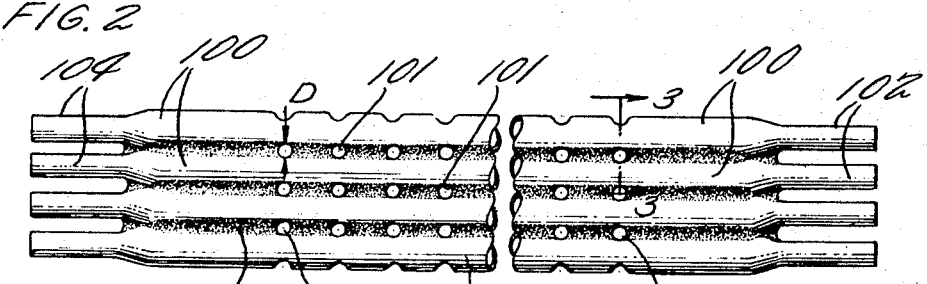
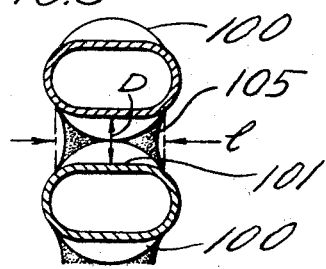
INVENTOR
GEORGE D. LEWIS
BY John M. McCarthy
AGENT

United States Patent Office 3,426,409
Patented Feb. 11, 1969

3,426,409
METHOD OF MAKING A TUBULAR WALLED CHAMBER
George D. Lewis, North Palm Beach, Fla., assignor to United Aircraft Corporation, East Hartford, Conn., a corporation of Delaware
Original application Jan. 26, 1965, Ser. No. 428,110, now Patent No. 3,359,737, dated Dec. 26, 1967. Divided and this application Apr. 13, 1966, Ser. No. 542,421
U.S. Cl. 29—157.4                               10 Claims
Int. Cl. B21d 53/00; B23k 31/02, 1/04

ABSTRACT OF THE DISCLOSURE

A method of making a perforated wall with a plurality of tubes having approximately circular cross section and being all approximately the same length. The method involves placing a crimp or groove along two substantially diametrically opposed sides with the crimps or grooves of adjacent tubes having the same spaced relationship. Said tubes being supported in contacting relation with the tubes being bonded together along their areas of contact, which is between the crimps or grooves. While the area between adjacent tubes is bonded, care is taken to see that each perforation, formed by mating grooves of adjacent tubes, is maintained at its proper size.

---

This invention relates to a method of making a combustion instability reduction device and particularly for the reduction of instability which may develop in the combustion chamber of a rocket engine.

This application is a division of application Ser. No. 428,110, filed Jan. 26, 1965, now U.S. Patent No. 3,359,737, to George D. Lewis for "Combustion Instability Reduction Device."

One object of this invention is to provide a method of making a device for acoustic damping adjacent the walls of a combustion chamber.

Another object of this invention is to provide a method of making a combustion chamber with a perforated wall with a backup chamber to reduce combustion instability.

A further object of this invention is to provide a method of making a combustion chamber having walls formed of tubes with openings, said tubes forming part of the instability reduction device.

Another object of this invention is to have adjacent tubes predimpled so that the adjacent tubes when positioned to form a combustion chamber have their dimples coact to form passages through the tube wall chamber.

Other objects and advantages will be apparent from the specification and claims and from the accompanying drawings which illustrate an embodiment of the invention.

FIGURE 1 is a side view of a rocket engine, partially in section, showing the combustion chamber and resonant chamber.

FIGURE 2 is an enlarged view showing a group of tubes taken from the combustion chamber as shown in FIG. 1.

FIGURE 3 is an enlarged view taken along the line 3—3 of FIG. 2.

FIGURE 1 shows a rocket engine 2 having a nozzle assembly 4, a combustion apparatus 6 and an injector head 8. The nozzle assembly 4 comprises an inner member 10 which has its inner surface formed to the desired contour of the nozzle throat while helical lands 18 extend around its outer periphery forming grooves 20, said lands extending from approximately one end to the other. The exit end of the nozzle is formed having a flange 22 which extends outwardly from the rear end of the inner member 20. The forward or inlet end of the nozzle 4 is formed having a circular series of grooves 26 to receive a plurality of ends of tubes 100 for a purpose to be hereinafter described.

Two semicircular members 30 are positioned over the inner member 10 forming passageways A with grooves 20. These members 30 while having their inner surface each contoured to meet with the contour of the member 10 at the ends of the lands 18, have their outer surfaces 36 each formed to be semicylindrical with a semicylindrical flange 44. When assembled, the surfaces 36 form a cylindrical face with an annular flange formed of the two halves 44. A flange 32 extends rearwardly from the inner edge of each semicircular member 30. This flange 32 and the ends of the semicircular members 30 form an annular groove 34 with the radially extending flange 22 of the inner member 10.

A cylindrical cover member 40 is placed around the semicircular members 30 and has an annular notch 42 which mates with flanges 44 on the semicircular portions. An annular flange 46 extends outwardly from this end of the cover member 40 for a purpose to be hereinafter described. The annular groove 34 becomes an annulus with the inner surface of cover member 40, connected to the free ends of the passageways A at the rear end of the nozzle. The free end of the flange 22 meets the under part of the rearward inner end of the cylindrical cover member 40 and is fixed thereto.

The combustion apparatus 6 comprises a series of tubes 100 fixed together with their axes paralleled and forming an annular ring. The tubes 100 are reduced in diameters at one end at 102 and at the other end at 104. The ends 102 are arranged to fit into the circular series of grooves 26 at the forward end of the nozzle 4. A ring-like plate 50 has its inner periphery formed of a series of grooves to cooperate with each of the grooves 26. Space between the holes formed by the grooves is filled by material of the inner member 10 and and ring-like plate 50, each extending inwardly approximately half way. This plate 50 is bolted to the flange 46 by bolts 52 to hold the nozzle assembly in position and connect the combustion apparatus 6 and nozzle assembly 4 together. In this assembled position, the forward ends of the passageways A are connected to the ends of tubes 100 to permit flow therebetween.

The ends 104 of the tubes 100 are arranged to fit into a circular series of openings 54 formed in the face of an annular rear member 56. The member 56, while being annular, can be constructed in any manner well known in the prior art, one construction would form the member of a forward and rearward half. A cylindrical member 58 is placed around the annular ring of tubes 100 with its one end fixed, as by brazing, to ring-like plate 50 where it meets it, and the other end is fixed in a similar manner to the outer circumference of member 56 at 60. This construction forms resonant chamber 59, bounded by outer cylindrical member 58, the inner combustion chamber absorber wall, and the end members 50 and 56.

The tubes 100 which form the cylindrical wall of the combustion chamber of the combustion apparatus 6 have holes 101 located between adjacent tubes to provide passages between the main combustion chamber and the resonant chamber 59 formed by the tubes 100, cylindrical member 58, ring-like plate 50 and annular ring member 56. This makes the combustion chamber wall an absorber wall. The holes 101 are formed by placing a semicircular dimple in adjacent tubes so that they will cooperate when the tubes are fixed together, thus, completing a passage. When the number and size of holes for a given combustion chamber has been determined, the tubes can all be properly dimpled, and with their ends fixed in a jig to hold them in the circular manner desired for the main combustion chamber, the tubes are then brazed so that they will be held together leaving the holes 101 the desired size. Once this cylindrical ring of tubes has been formed, it can be fixed in the rocket engine as set forth above.

An external circular manifold 62 encircles the member 56 and is connected to an internal annular manifold 64 formed in the lower part of the member 56 by a plurality of tubes 66 and passageways 68 in member 56. A tube 70 directs flow away from the manifold 62. The passageways 68 and tubes 66 are made of such size to carry the flow through the tubes 100. The injector head 8 can be of any known design and directs propellants into said chamber formed by tubes 100.

A coolant supply 150 is connected by a conduit 152 to the annulus formed by the annular groove 34 and inner surface of cover member 40. The conduit 152 extends through the cover member 40. Valve means 154 is placed along the conduit 152 to control flow from the coolant supply. A coolant supply is also connected to the chamber 59 formed around the main combustion chamber by a conduit 162. This conduit extends through the cylindrical member 58. A valve means 164 is connected in conduit 162 to control the flow of coolant therethrough. This valve means 164 can be actuated by a temperature probe located somewhere within the combustion chamber or nozzle to automatically initiate a flow of coolant therethrough when necessary.

It can be seen that propellants will be injected into the combustion chamber from the injector head 8 so that they will ignite therein. The products of combustion will be directed to the nozzle assembly 4 to be exhausted therefrom. While the rocket engine is operating, the coolant supply will pass through conduit 152 with valve 154 open and flow through the annular groove 34 into the rear ends of the grooves 20 between the lands 18 and then flow into the ends 102 of the tubes 100. This flow will then cool the tubes 100 and pass into the internal annular manifold 64. From this manifold it will pass radially outwardly through passageways 68 and tubes 66 into the external circular manifold 62. From this manifold the coolant can be redirected to the coolant supply 150 or if a propellant has been used for cooling it can be directed to the injector head 8 to be used for ignition.

When extreme temperatures are reached at some area within the combustion chamber or nozzle, the valve means 164 can be turned on and a coolant will be directed to chamber 59 and flow through holes 101 to provide film cooling along the inside of the combustion chamber and nozzle.

Most engines that experience combustion instability produce chamber pressure fluctuations at a predominant frequency that is related to the acoustic resonant modes of the chamber. Typical examples are the first tangential mode and first longitudinal mode. Radial modes and higher harmonics are also encountered. The basic mode frequencies can be approximately calculated as follows:

First tangential, $f = 0.586c/2R$

First radial, $f = 1.22c/2R$

First longitudinal, $f = c/2X$ where $f$ = predominant frequency of instability
$c$ = speed of sound of gas medium in combustion chamber
$R$ = combustion chamber radius
$X$ = combustion chamber length from injector to nozzle The frequencies of pressure disturbance can also be obtained by the use of pressure recording equipment which is placed to record pressure fluctuations within the combustion chamber. This reference has been made to the chamber pressure fluctuations because a knowledge of the frequency of these fluctuations is needed for solving the following formulae. Having a combustion chamber design, the geometric dimensions of the absorbing or resonant chamber of a combustion instability reduction device can be determined by solving the following formulae with values of D, L, $l$ and $\delta$, to obtain the highest value of $\alpha$, the absorbtion coefficient, defined as the fraction of incident energy absorbed. This coefficient is calculated by (1) $$\alpha = \frac{4\theta}{(\theta+1)^2 + Q^2\theta^2\left(\frac{f}{f_0} - \frac{f_0}{f}\right)^2}$$

where $\theta$, the specific acoustic resistance, is calculated by (2) $$\theta = \frac{2\sqrt{2}(\mu\rho\omega_0)^{1/2}(\epsilon + l/D)}{\sigma\rho c}$$

and Q, the quality factor, is determined by (3) $$Q = \frac{\omega l_{eff}}{\theta\sigma c}$$

where $l_{eff}$, the effective length of the acoustic mass, is figured by (4) $$l_{eff} = l + 0.85D(1 - 0.7\sqrt{\sigma})$$

and $f_0$, resonant frequency of the absorber, is determined by (5) $$f_0 = \frac{c}{2\pi}\sqrt{\frac{\sigma}{Ll_{eff}}}$$

Listed below are the symbols set forth in the formulae above together with their meaning:

$c$ = speed of sound of gas medium is resonant chamber
$D$ = diameter of openings in combustion chamber absorber wall
$f$ = frequency of pressure disturbance in combustion chamber
$f_0$ = resonant frequency of the resonant chamber
$L$ = depth of resonant chamber around combustion chamber
$l$ = length of openings in combustion chamber absorber wall
$l_{eff}$ = effective length of the openings in combustion chamber absorber wall
$Q$ = quality factor
$\alpha$ = absorbtion coefficient
$\epsilon$ = nonlinear resistance factor
$\theta$ = specific acoustic resistance
$\mu$ = absolute viscosity of gas medium in resonant chamber
$\rho$ = mass density of gas medium in resonant chamber
$\sigma$ = absorber open area ratio, percent open area of combustion chamber absorber wall
$\omega_0$ = angular resonant frequency of resonant chamber
$\omega$ = angular frequency of pressure disturbance in combustion chamber In solving the formulae set forth above to arrive at a high value of $\alpha$ for specific values of D, L, $l$ and $\sigma$, Formula 4 is solved directly since all symbol values are known. Formula 5 can them be solved since all of its values are now known. Formula 2 is solved directly using values of $\epsilon$ obtained from empirical correlations relating $\epsilon$ to particle velocity and/or particle displacement as shown in the following references:

(1) "On the Theory and Design of Acoustic Resonators" by Uno Ingard, pp. 1037–1061, in The Journal of the Acoustical Society of America of November 1953.
(2) "Effect of Nonlinear Losses on the Design of Absorbers for Combustion Instabilities" by A. W. Blackman, pp. 1022–1028, of the American Rocket Society Journal of November 1960.

Formula 3 can then be solved since all of its values are now known. The values of $\theta$, Q, $f$, and $f_0$ are then placed in Formula 1 and this formula is solved to arrive at $\alpha$. As stated hereinbefore, the values of D, L, $l$ and $\sigma$ are varied until the highest value of $\alpha$ is obtained.

With reference to the Helmholtz resonator, this resonator is discussed in chapter 8 of the Fundamentals of Acoustics by Kinsler and Frey.

Referring again to the method of making the perforated chamber wall with a plurality of tubes, the dimples or crimps can be formed by any means desired so as to obtain a side profile as viewed in FIG. 2 with the dimple depth being made ½D. Each tube is crimped so that meeting sides of adjacent tubes will have identical crimping spacing whereby each crimp on one side of one tube cooperates with a crimp on the mating side of the adjacent tube to form the perforations or holes 101. When the tube assembly is brazed together the braze material is permitted to fill in the grooved area a predetermined amount as at 105 between holes 101 of adjacent tubes and from each hole 101 to its respective tube ends 102 or 104 of the assembly. This "fill in" (see FIG. 3) provides the "*l*" for the holes 101 and the "D" in the lengthwise plane between tubes. While the brazing is being done, the holes are maintained their proper D. If any hole becomes clogged or restricted it can be made its proper size by drilling or by any other method known in the art.

Although only one embodiment of this invention has been illustrated and described herein, it will be apparent that various changes and modifications may be made in the construction and arrangement of the various parts without departing from the scope of this novel concept.

I claim:

1. Method of making a perforated wall with a plurality of round tubes of approximately the same length comprising:
   (a) crimping a plurality of said tubes at a plurality of places in the same spaced relationship transversely of their longitudinal axis, said crimping being done on two substantially diametrically opposed sides of each tube,
   (b) supporting said tubes in juxtaposed and contacting relation with their longitudinal axes arranged in a curved array so that a crimp of one tube cooperates with a crimp of an adjacent tube to form a perforation,
   (c) each crimped tube in its supported position having at least two uncrimped areas in contact with each adjacent tube, and
   (d) bonding said tubes together along said contact areas.

2. A method as set forth in claim 1 wherein the perforated wall is to be a cylindrical chamber and in element (b) the curved array is circular.

3. A method as set forth in claim 1 where in element (d) the tubes are bonded by brazing including filling in the grooved area between adjacent tubes along said contact area maintaining each perforation its proper size.

4. Method of making a perforated cylindrical chamber with a plurality of round tubes of approximately the same length comprising:
   (a) crimping said plurality of tubes transversely of their longitudinal axis with a plurality of crimps in a like manner on two substantially diametrically opposed sides,
   (b) supporting said tubes in juxtaposed and contacting relation with their longitudinal axes arranged in a cylindrical array so that the plurality of crimps of one tube cooperates with the plurality of crimps of an adjacent tube to form a line of perforations,
   (c) each crimped tube in its supported position having a plurality of uncrimped areas in contact with each adjacent tube, and
   (d) bonding said tubes together along said contact areas.

5. A method as set forth in claim 4 where in element (d) the tubes are bonded by brazing including filling in the grooved area between adjacent tubes along said contact areas maintaining each perforation its proper size.

6. Method of making a cylindrical combustion chamber having a perforated wall with a plurality of round tubes of approximately the same length comprising:
   (a) crimping each of said tubes with a plurality of crimps in a like manner transversely of its longitudinal axis,
   (b) supporting said tubes in juxtaposed relation with their longitudinal axes arranged in a cylinder so that each crimp on one side of a tube cooperates with a mating crimp of the plurality of crimps on one side of an adjacent tube to form perforations,
   (c) each tube in its supported position having the uncrimped areas on each side of a crimp in contact with each adjacent tube, and
   (d) bonding said tubes together along said contact areas.

7. A method as set forth in claim 6 where in element (d) the tubes are bonded by brazing including filling in the grooved area between adjacent tubes along said contact areas maintaining each perforation its proper size.

8. A method as set forth in claim 2 where in element (a) the crimping is done to a depth of ½D where D = diameter of the perforations, and in element (d) the tubes are bonded by brazing including filling in the grooved area between adjacent tubes along said contact areas maintaining each perforation its proper size.

9. A method as set forth in claim 1 wherein the following step is taken:
   (e) sizing the perforations formed between adjacent tubes.

10. A method as set forth in claim 6 wherein the following step is taken:
    (e) placing a solid cylindrical wall around the tubes to form an annular resonant chamber.

References Cited

UNITED STATES PATENTS

| | | | |
|---|---|---|---|
| 877,609 | 1/1908 | Steiner | 165—148 |
| 891,302 | 6/1908 | Steiner | 165—148 |
| 1,420,241 | 6/1922 | Cain | 29—157.4 |
| 3,045,340 | 7/1962 | Kolling | 29—471.1 |
| 3,123,907 | 3/1964 | Thomas | 29—471.1 X |
| 3,127,737 | 4/1964 | Ledwith. | |
| 3,208,132 | 9/1965 | Escher | 29—455 X |

JOHN F. CAMPBELL, *Primary Examiner.*

J. L. CLINE, *Assistant Examiner.*

U.S. Cl. X.R.

29—475, 483